US008817855B2

(12) United States Patent
Asmanis et al.

(10) Patent No.: US 8,817,855 B2
(45) Date of Patent: Aug. 26, 2014

(54) METHOD AND APPARATUS FOR ALIGNING AND INTEGRATING SERIAL DATA STREAMS

(71) Applicant: Avago Technologies General IP (Singapore) Pte. Ltd., Singapore (SG)

(72) Inventors: Georgios Asmanis, Lake Forest, CA (US); Faouzi Chaahoub, San Jose, CA (US); Ravi Teja Kotamraju, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 13/645,380

(22) Filed: Oct. 4, 2012

(65) Prior Publication Data

US 2014/0099106 A1     Apr. 10, 2014

(51) Int. Cl.
 *H04B 1/38* (2006.01)
(52) U.S. Cl.
 USPC .................................. 375/220; 455/73; 710/1
(58) Field of Classification Search
 CPC .................................................. H04L 25/0264
 USPC .......................................................... 375/220
 See application file for complete search history.

(56) References Cited

U.S. PATENT DOCUMENTS

| 6,418,537 | B1  |   | 7/2002  | Yang et al. |         |
|-----------|-----|---|---------|-------------|---------|
| 6,631,144 | B1  | * | 10/2003 | Johansen    | 370/516 |
| 6,993,108 | B1  | * | 1/2006  | Chi et al.  | 375/376 |
| 7,227,875 | B2  |   | 6/2007  | Deng        |         |
| 7,287,176 | B2  |   | 10/2007 | Kim et al.  |         |
| 7,363,563 | B1  | * | 4/2008  | Hissen et al. | 714/733 |
| 7,500,131 | B2  |   | 3/2009  | Panikkar et al. |     |
| 7,801,203 | B2  | * | 9/2010  | Chen et al. | 375/219 |
| 7,821,343 | B1  | * | 10/2010 | Wong et al. | 331/2   |
| 7,894,537 | B2  | * | 2/2011  | Mohiuddin   | 375/257 |
| 8,073,090 | B2  | * | 12/2011 | Zhang et al. | 375/362 |
| 8,406,258 | B1  | * | 3/2013  | Wong et al. | 370/516 |
| 2008/0117984 | A1 | * | 5/2008  | Hao et al. | 375/240.26 |
| 2008/0273623 | A1 | * | 11/2008 | Chung et al. | 375/295 |
| 2009/0052600 | A1 | * | 2/2009  | Chen et al. | 375/359 |
| 2009/0086870 | A1 | * | 4/2009  | Mohiuddin   | 375/371 |
| 2011/0291702 | A1 | * | 12/2011 | Kaeriyama   | 326/62  |
| 2012/0039404 | A1 | * | 2/2012  | Chung et al. | 375/259 |

* cited by examiner

*Primary Examiner* — Chieh Fan
*Assistant Examiner* — Santiago Garcia (57) ABSTRACT

An integrated circuit is incorporated into a communications system to enable a channel to achieve data rates that are at least double that which are currently achievable. The integrated circuit combines serial data signals using recovered clock and serial data signals in reference and non-reference clock domains. The integrated circuit rate converts recovered serial data in one of the clock domains, performs a phase alignment at the converted data rate, and returns the rate converted and phase-aligned serial data to the recovered data rate in response to the recovered clock from the remaining clock domain. Thereafter, the recovered and aligned serial data signals are combined. The phase alignment is monitored in circuitry that detects when a threshold offset is violated. When the threshold offset is violated a synchronization circuit is enabled.

20 Claims, 10 Drawing Sheets

METHOD AND APPARATUS FOR ALIGNING AND INTEGRATING SERIAL DATA STREAMS

TECHNICAL FIELD

The invention relates to optical communications networks over which data is communicated in the form of optical signals transmitted and received over optical waveguides.

BACKGROUND

In optical communications networks, optical transceiver modules are used to transmit and receive optical signals over optical fibers. An optical transceiver module generates modulated optical signals that represent data, which are then transmitted over an optical fiber coupled to the transceiver module. Each transceiver module includes a transmitter side and a receiver side. On the transmitter side, a laser light source generates laser light and an optical coupling system receives the laser light and optically couples the light onto an end of an optical fiber. The laser light source typically is made up of one or more laser diodes that generate light of a particular wavelength or wavelength range. The optical coupling system typically includes one or more reflective elements, one or more refractive elements and/or one or more diffractive elements. On the receiver side, a photodiode detects an optical data signal transmitted over an optical fiber and converts the optical data signal into an electrical signal, which is then amplified and processed by electrical circuitry of the receiver side to recover the data. The combination of the optical transceiver modules connected on each end of the optical fiber and the optical fiber itself is commonly referred to as an optical fiber link.

In switching systems that are commonly used in optical communications networks, each optical transceiver module is typically mounted on a circuit board that is interconnected with another circuit board that is part of a backplane of the switching system. The backplane typically includes many circuit boards that are electrically interconnected with one another. In many such switching systems, each circuit board of the backplane has an application specific integrated circuit (ASIC) mounted on it and electrically connected to it. Each ASIC is electrically interconnected with a respective optical transceiver module via electrically-conductive traces of the respective circuit boards. In the transmit direction, each ASIC communicates electrical data signals to its respective optical transceiver module, which then converts the electrical data signals into respective optical data signals for transmission over the optical fibers that are connected to the optical transceiver module. In the receive direction, the optical transceiver module receives optical data signals coupled into the module from respective optical fibers connected to the module and converts the respective optical data signals into respective electrical data signals. The electrical data signals are then output from the module and are received at respective inputs of the ASIC, which then processes the electrical data signals. The electrical interconnections on the circuit boards that connect inputs and outputs of each ASIC to outputs and inputs, respectively, of each respective optical transceiver module are typically referred to as lanes.

Figure 1:
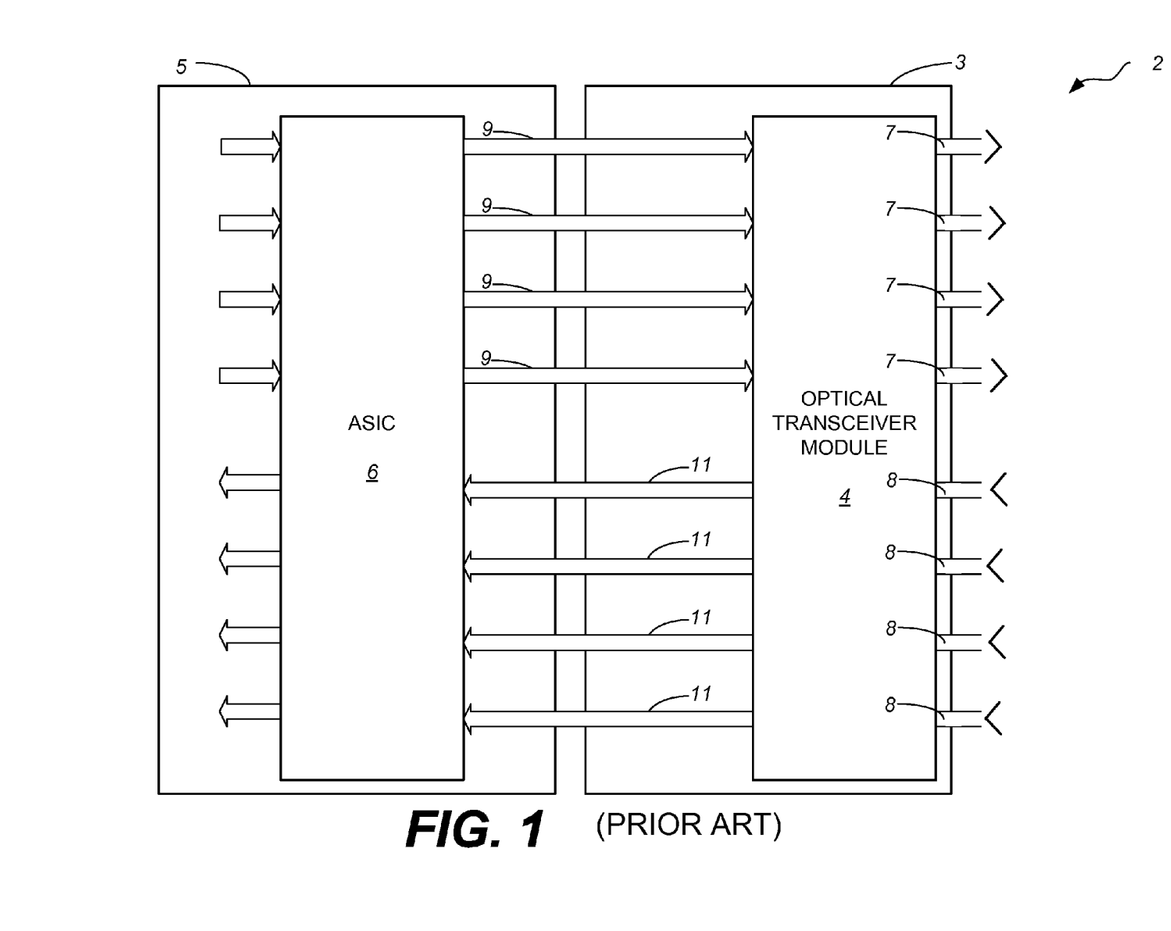
FIG. 1 illustrates a block diagram of a known optical communications system.

FIG. 1 illustrates a block diagram of a known optical communications system 2. The optical communications system 2 comprises a first circuit board 3, an optical transceiver module 4 mounted on the first circuit board 3, a backplane circuit board 5, and an ASIC 6 mounted on the backplane circuit board 5. Four output optical fibers 7 and four input optical fibers 8 are connected to the optical transceiver module 4. In the transmit direction, the ASIC 6 produces four electrical data signals, which are output from the ASIC 6 onto four respective output lanes 9 to the optical transceiver module 4. The optical transceiver module 4 then converts the four electrical data signals into four respective optical data signals and couples them into the ends of four respective optical fibers 7 for transmission over the optical fiber link. In the receive direction, four optical data signals are coupled from the ends of four respective optical fibers 8 into the optical transceiver module 4, which then converts the optical data signals into four electrical data signals. The four electrical data signals are then output over four respective input lanes 11 to four respective inputs of the ASIC 6 for processing by the ASIC 6. Each of the electrical data signals and optical data signals are operative at a data rate of 10 Gbps. Thus, the optical fiber link, with four data channels of 10 Gbps each in the transmit direction, has a transmit data rate of 40 Gbps. Similarly, the optical fiber link, with four data channels of 10 Gbps each in the receive direction, has a receive data rate of 40 Gbps. The data rate of the optical fiber link can be increased by increasing the number of optical transceiver modules 4 and ASICs 6 that are included in the link. For example, if four optical transceiver modules 4 and four ASICs 6 are included in the optical communications system 2, the optical fiber link will have a data rate of 160 Gbps in the transmit direction and 160 Gbps in the receive direction.

Ever-increasing demands for greater bandwidth often lead to efforts to upgrade optical fiber links to achieve higher data rates. Doing so, however, typically requires either duplicating the number of optical transceiver modules and ASICs that are used in the optical communications system, as described above, or replacing the optical transceiver modules and ASICs with optical transceivers and ASICs that operate at higher data rates. Of course, duplicating the number of optical transceiver modules and ASICs that are used in the optical communications system increases the cost associated with providing and operating such a solution. Similarly, it is desirable to avoid costs associated with developing and providing ASICs that operate at higher data rates. Consequently, it is desirable to provide a way to substantially increase the bandwidth of an optical fiber link without having to duplicate the number of optical transceiver modules and ASICs that are employed in the optical communications system.

Another approach to increase the bandwidth of a communication link is to combine two or more data channels prior to transmission. Such implementations are complicated for at least the reason that the two or more data channels should be synchronized before they can be combined. One conventional approach to synchronizing serial data channels involves delaying a first data channel to align the data signal therein with a respective data signal in a second data channel. While the insertion of static delays in a data channel is desirable for its low power consumption and relatively small circuit area footprint requirements, this approach has a limited compensation range that make it unsuitable for relatively large data signal skews. A second conventional approach to synchronizing serial data channels involves adjusting the incoming data rate and buffering the reduced rate data channels with an elastic first-in first-out (FIFO) buffer. The elastic FIFO is used to adjust the data based on a divided clock from a clock and data recovery circuit before the FIFO outputs are combined. While this second conventional approach is capable of correcting a relatively larger range of dynamic skew between the data channels, the additional circuitry adds significantly to the circuit area required and increases overhead power consumption.

Accordingly, it would be desirable to provide a way to upgrade a communication link to achieve higher data rates without having to duplicate the number of optical transceiver modules and ASICs that are employed in the optical communications system and without having to redesign the ASIC.

SUMMARY

A method and apparatus for aligning and integrating serial data streams are disclosed. The apparatus, which can be embodied in an integrated circuit or bridge circuit, comprises a first or input signal interface, reference and non-reference circuitry coupled to the first interface, rate conversion circuitry coupled to receive clock and data signals from the reference and non-reference circuitry, respectively, synchronization circuitry and signal integration circuitry. The first or input signal interface includes N input terminals that receive serial data signals at a first data rate. The first signal interface further includes clock and data recovery circuits that generate a set of recovered serial data signals for each of N serial data signals, a recovered clock, and a divided clock in each of N clock domains, where N is a positive even integer. The reference circuitry receives a set of recovered serial data signals from a first member of a pair of input terminals. The reference circuitry further generates a reference clock responsive to a representation of the first data rate in a reference clock domain. The reference circuitry also generates a representation of the serial data signal received at the first member of the pair of input terminals. The non-reference circuitry receives a set of recovered serial data signals from the remaining member of the pair of input terminals. The non-reference circuitry generates a representation of the serial data signal received at the remaining member of the pair of input terminals, the representation operative at a second data rate in a non-reference clock domain. The rate conversion circuitry receives the representation of the serial data signal received at the remaining member of the pair of input terminals from the non-reference circuitry and the reference clock from the reference circuitry. The rate conversion circuitry generates a rate converted representation of the serial data signal received at the remaining member of the pair of input terminals. The synchronization circuitry adjusts a phase margin between the reference clock and the non-reference clock as applied to the non-reference circuitry and the rate conversion circuitry. The signal integration circuitry receives the recovered clock signal, the representation of the serial data signal received at the first member of the pair of input terminals and the rate converted representation of the serial data signal received at the remaining member of the pair of input terminals. The signal integration circuitry generates a combined serial data signal.

The method, which can be enabled in an integrated circuit or with a collection of non-integrated circuit elements includes the steps of in an interface having N input terminals and N/2 output terminals, receiving N serial data signals having a first data rate, wherein N is an even integer; recovering a first serial data signal received at a first of the N input terminals to generate a first clock signal operating at the first data rate in a first clock domain; dividing the first clock signal to generate a second clock signal operating at a second data rate in the first clock domain; applying a first set of recovered data signals at respective inputs of a first 2×1 multiplexer to generate a representation of the first serial data signal; recovering a second serial data signal received at a second of the N input terminals to generate a third clock signal operating at the first data rate in a second clock domain; dividing the third clock signal to generate a fourth clock signal operating at the second data rate in the second clock domain; applying a second set of recovered data signals at respective inputs of a 1×M demultiplexer operating in accordance with the fourth clock signal to generate a first representation of the second serial data signal, where M is an even integer; applying the representation of the second serial data signal at an input of a 1×M multiplexer operating in accordance with the second clock signal to generate a second representation of the second serial data signal; and applying the representation of the first serial data signal and the second representation of the second serial data signal to the inputs of a second 2×1 multiplexer operating in accordance with the first clock signal to generate a combined serial data signal.

These and other features and advantages of the method and apparatus will become apparent from the following description, drawings and claims.

DETAILED DESCRIPTION OF ILLUSTRATIVE EMBODIMENTS

An integrated circuit is incorporated into a communications system to enable a channel to achieve data rates that are at least double that which are currently achievable. The integrated circuit combines serial data signals using recovered clock and serial data signals in reference and non-reference clock domains. The integrated circuit rate converts recovered serial data in one of the clock domains, performs a phase alignment at the converted data rate, and returns the rate converted and phase-aligned serial data to the recovered data rate in response to the recovered clock from the remaining clock domain. Thereafter, the recovered and aligned serial data signals are combined. The phase alignment is monitored in circuitry that detects when a threshold offset is violated. When the threshold offset is violated a synchronization circuit is enabled.

In the present design, and as will be explained in greater detail in association with the embodiment illustrated in FIG. 5, recovered data signals in a second channel are demultiplexed in accordance with the recovered clock signal from the same channel. The parallel outputs (i.e., the recovered data signals) are multiplexed back to the original data rate using the recovered clock signal from the reference or remaining channel. The clocks applied to the demultiplexer and the multiplexer are aligned during startup to maximize phase margin at the interface between the two clock domains (i.e., between the demultiplexer and the multiplexer).

A clock synchronization circuit will be explained in detail in association with the embodiment illustrated in FIG. 6. The clock synchronization circuit eliminates clock uncertainty and initialization glitches. The circuit and method can handle up to +/−12 UI of dynamic skew between the two serial data streams. The approach is easily expanded to align and integrate two serial data streams into a single aligned data stream over as many even number channels as may be desired. The approach introduces significant power savings as FIFO logic is no longer required and only one of the data streams is rate adjusted by the demultiplexer-multiplexer combination.

Thus, incorporation of the integrated circuit or bridge circuit into the optical communications system allows ASICs of an existing design to be used with a high-speed optical transceiver module to achieve a data rate for the optical fiber link that is at least double the previous data rate of the link. These and other features and advantages of the invention will now be described with reference to the illustrative, or exemplary, embodiments shown in FIGS. 2-10, in which like reference numerals represent like elements or features.

Figure 2:
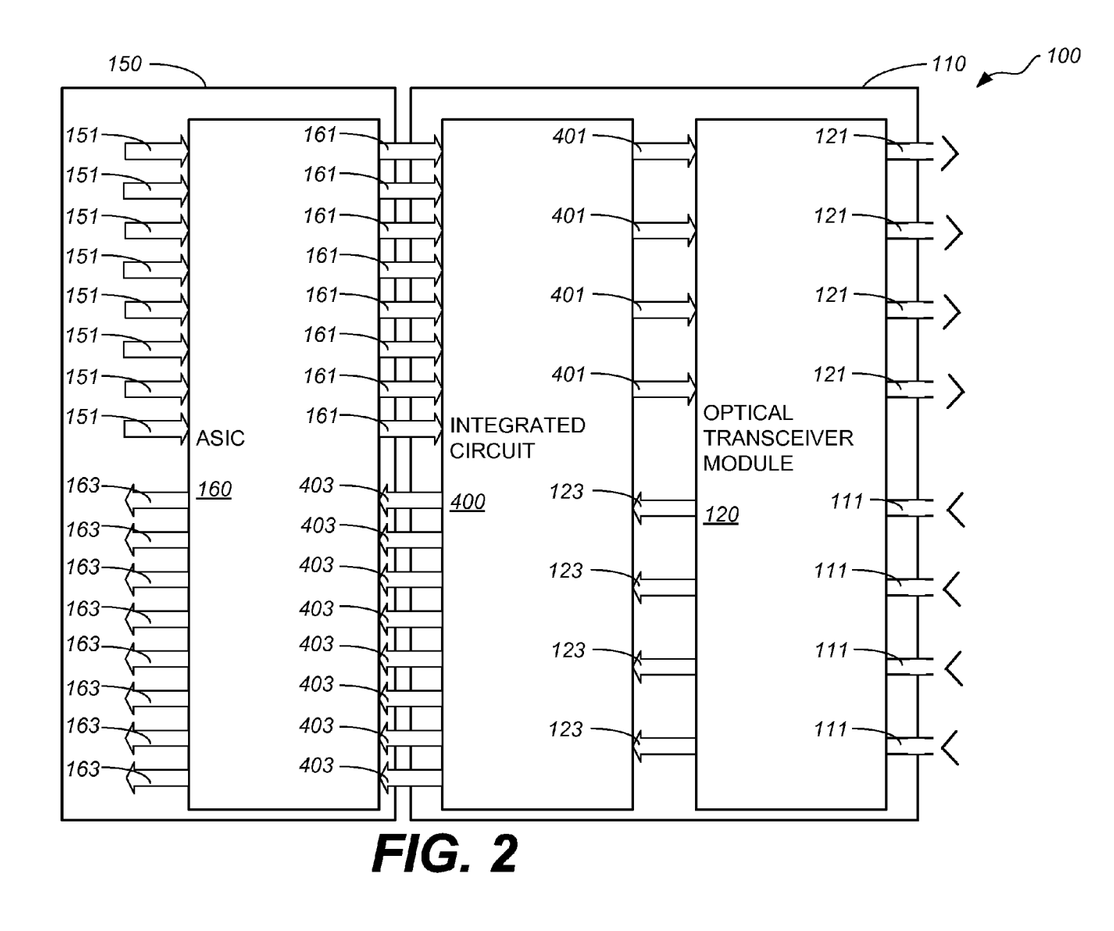
FIG. 2 illustrates a block diagram of an optical communications system located on one end of the high-speed optical fiber link in accordance with one illustrative, or exemplary, embodiment of the invention.

FIG. 2 illustrates a block diagram of an optical communications system 100 located on one end of the high-speed optical fiber link in accordance with one illustrative, or exemplary, embodiment of the invention. The optical communications system 100 comprises a first circuit board 110 and a backplane circuit board 150. An integrated circuit 400 and a high-speed optical transceiver module 120 are mounted on the first circuit board 110. An ASIC 160 is mounted on the backplane circuit board 150. In accordance with this illustrative embodiment, the ASIC 160 supports eight data channels or lanes, which corresponds to two of the ASICs 6 shown in FIG. 1, which supported four data channels or lanes. For ease of illustration, the ASIC 160 is represented as a single block in the block diagram of FIG. 2. However, ASIC 160 may comprise one or more sub-circuits to support each of the individual data channels or lanes. It should also be noted that although two separate circuit boards (i.e., the first circuit board 110 and the backplane circuit board 150) are shown in FIG. 2, the integrated circuit 400, the high-speed optical transceiver module 120 and the ASIC 160 could be mounted on a single circuit board, such as the first circuit board 110 or the backplane circuit board 150.

In accordance with the illustrative embodiment shown in FIG. 2, eight serial data lanes or channels 151 are received at corresponding inputs of the ASIC 160. The eight serial data lanes are buffered or otherwise processed by the ASIC 160 and communicated to the integrated circuit 400 along eight serial data lanes or channels 161 interconnecting the ASIC 160 and the integrated circuit 400. As briefly indicated, the integrated circuit 400 processes the signals received along the eight serial data lanes in pairs. The integrated circuit 400 uses the data in one of the serial data lanes as a reference. The data in the remaining data lane of the pair is rate adjusted and the rate adjusted data is aligned using a reference clock generated from the data in the reference lane. Thereafter, the rate adjusted and aligned data is combined with the data in the reference lane to generate a combined data signal. Thus, N received serial data lanes or channels are combined to form N/2 combined serial data lanes. The N/2 combined serial data lanes operate at a data rate that is twice the data rate of the signals received at the integrated circuit 400 along the eight serial data lanes or channels 161. The combined serial data signals are communicated from the integrated circuit 400 to an optical transceiver module 120 along four serial data lanes or channels 401. The N/2 combined serial data lanes or channels (electrical signals) are converted to separate and distinct optical signals that are transmitted along corresponding optical fibers 121 that are optically and mechanically coupled to the optical transceiver module 120. In an example embodiment, eight electrical data signals operating at approximately 10 Gbps are transmitted on the output lanes 161 from the ASIC 160 to the integrated circuit 400. The integrated circuit 400 aligns and combines the eight electrical data signals operating at approximately 10 Gbps into four combined electrical data signals operating at approximately 20 Gbps and transmits the four combined electrical data signals onto output lanes 401 to communicate the signals to the optical transceiver module 120.

The optical transceiver module 120 converts each combined electrical data signal into a 20 Gbps optical data signal and outputs the optical data signals onto respective optical fibers 121. Conversely, in a receive direction, the optical transceiver module 120 receives four 20 Gbps optical data signals, generated from a remote optical transceiver (not shown), along four input optical fibers 111 that are optically and mechanically coupled to the optical transceiver module 120. The optical transceiver module 120 converts the optical data signals into four electrical data signals operating at approximately 20 Gbps. The four electrical data signals are then delivered over the four input lanes 123 to the integrated circuit 400, which converts the four electrical data signals into eight electrical data signals operating at approximately 10 Gbps. The eight electrical data signals are then delivered over the eight input lanes 403 to the ASIC 160, which processes the eight electrical data signals in the known manner in which the ASIC 6 shown in FIG. 1 processes 10 Gbps electrical data signals. As further indicated in FIG. 2, on the backplane side of the ASIC 160, there are typically eight input lanes 151 and eight output lanes 163 for communicating with other devices or elements (not shown) of the communication system 100.

Another instance of the integrated circuit or bridge circuit 400 may be added to the backplane side of the backplane circuit board 150 to double the data rate of the electrical data signals that are communicated between elements or devices of the backplane, as will now be described with reference to FIG. 3.

Figure 3:
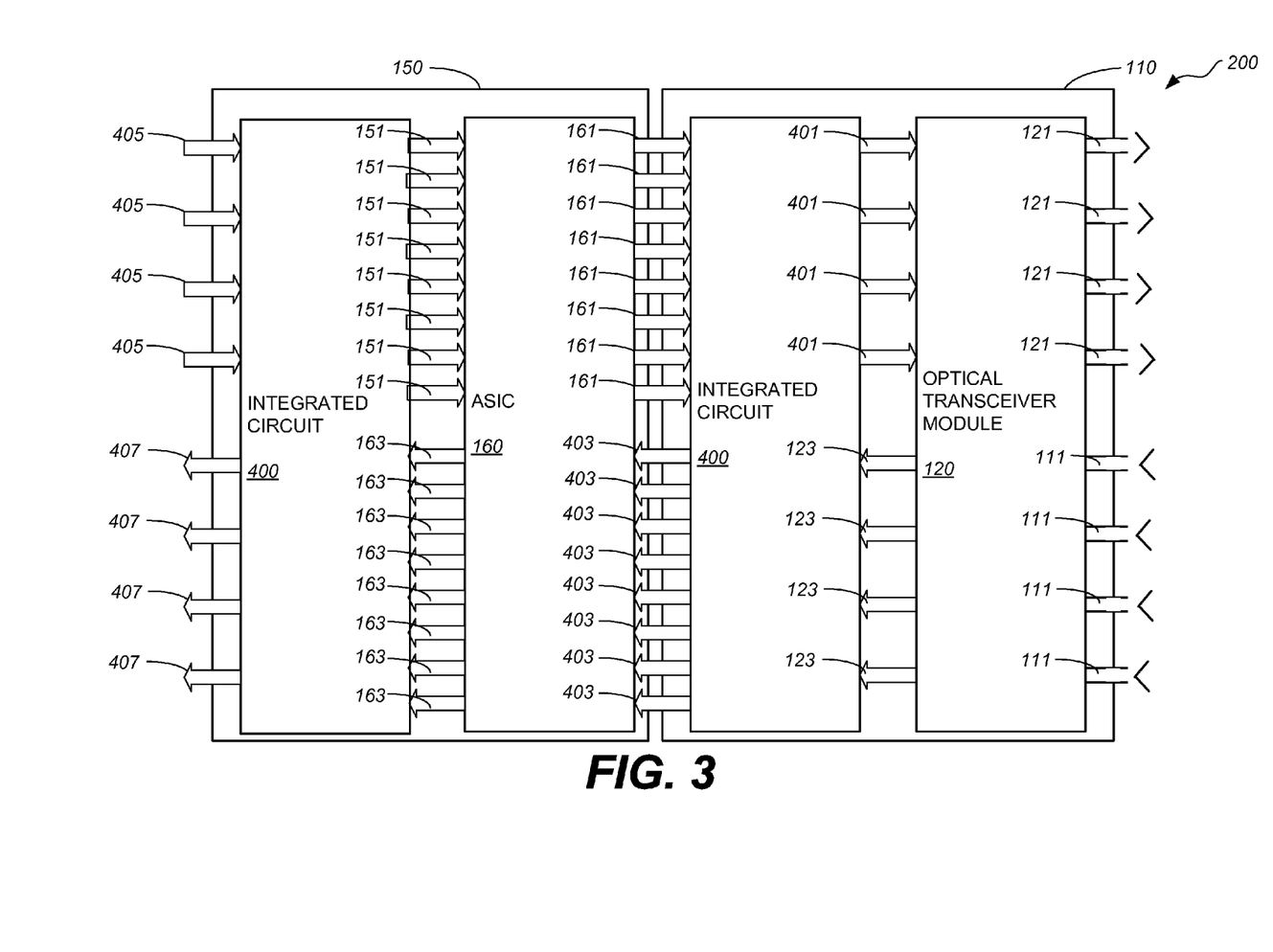
FIG. 3 illustrates a block diagram of an alternative optical communications system located on one end of a high-speed optical fiber link.

FIG. 3 illustrates a block diagram of an optical communications system 200 that is identical to the optical communications system 100 shown in FIG. 2 except that the optical communications system 200 includes an integrated circuit or second bridge circuit 400 that is interconnected with the ASIC 160 on the backplane side of the system 200. The integrated circuit 400 receives four 20 Gbps electrical data signals over four input lanes 405 and outputs four 20 Gbps electrical data signals over four output lanes 407. The four 20 Gbps electrical data signals that are received at the integrated circuit 400 over input lanes 405 are output from an identically configured integrated circuit, such as the integrated circuit 400, of an identical optical communication system 200 located elsewhere in the same switching system. Similarly, the four 20 Gbps electrical data signals that are output from the integrated circuit 350 over output lanes 407 are input to an identically configured integrated circuit 400 of an identical optical communication system 200 located elsewhere in the same switching system. In this way, the integrated circuits or bridge circuits 400 allow ASICs 160 of the same switching system or of different, but similarly configured, switching systems to communicate with one another at the higher data rate of 20 Gbps instead of 10 Gbps.

Figure 4:
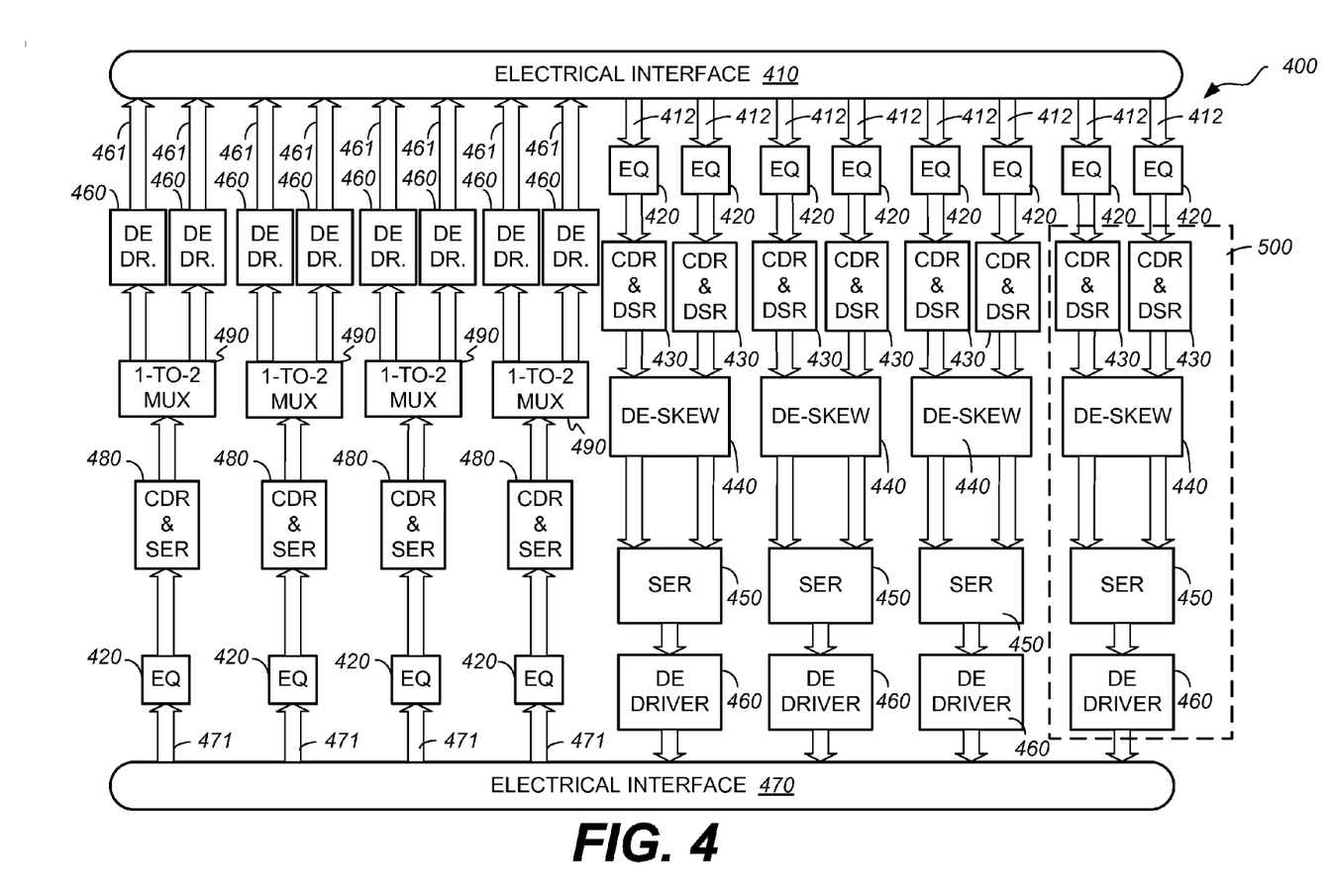
FIG. 4 illustrates a functional block diagram of the integrated circuit introduced in FIG. 2 in accordance with an illustrative embodiment.

FIG. 4 illustrates a block diagram of the integrated circuit 400 shown in FIG. 2 and FIG. 3 in accordance with an illustrative embodiment. In the example embodiments described above with reference to FIGS. 2 and 3, the integrated circuit 400 has been described in terms of performing a rate conversion, aligning clock signals, returning the adjusted channel to an initial data rate and combining the signals. However, to accomplish these functions, the integrated circuit 400, or circuits coupled thereto, perform additional operations, such as, for example, clock and data recovery (CDR), serialization/deserialization, multiplexing and demultiplexing. The functional components of the integrated circuit 400 and the operations they perform will now be described with reference to FIG. 4.

An electrical interface 410 interfaces the integrated circuit 400 with the ASIC 160 (FIG. 2, FIG. 3). The electrical interface 410 may be, for example, an XLAUI (i.e., a 40 Gbps attachment unit interface that includes 4 data lanes operating at 10.3125 Gbps) interface, which is a well-known interface for interfacing integrated circuits. For the incoming electrical data signals, which for simplicity will be described as 10 Gbps data signals, received over lanes 161 from the ASIC 160, four pairs of lanes 412 (8 lanes total) that are internal to the integrated circuit 400 provide the received electrical data signals to respective equalizers 420. The equalizers 420 restore the respective electrical data signals to their original waveforms and output each pair of the restored electrical data signals to respective clock and data recovery and deserializer (CDR & DSR) components 430. The CDR and DSR components 430 perform clock and data recovery and deserialization on each of the electrical data signals of the respective data paths and output the resulting electrical data signals to respective de-skew components 440. The de-skew components 440 perform static and dynamic phase alignment on the respective pairs of electrical data signals (8 lanes total) and provide the phase-aligned electrical data signals to respective 20 Gpbs serializer components 450.

The 20 Gpbs serializer components 450 perform serialization on the two phase-aligned electrical data signals of the respective pairs to produce respective 20 Gbps electrical data signals. The four 20 Gbps electrical data signals are then delivered to respective de-emphasis (DE) drivers 460, which de-emphasize and amplify the respective 20 Gbps electrical data signals and deliver the respective 20 Gbps electrical data signals to an electrical interface 470. The electrical interface 470 is a physical layer/media access layer device (PMD) configured to interface the integrated circuit 400 with the optical transceiver module 120 (FIG. 2). The resulting 20 Gbps electrical data signals are then delivered to the optical transceiver module 120, which converts them into 20 Gbps optical data signals and couples the optical data signals onto respective optical fibers 121 (FIG. 2).

In the receive direction, the electrical interface 470 receives four 20 Gbps electrical data signals from the optical transceiver module 120 (FIG. 2) and delivers them via respective internal lanes 471 to respective equalizers 420. The equalizers 420 perform equalization on the respective 20 Gbps electrical data signals and deliver the equalized electrical data signals to respective CDR & SER components 480. The CDR & SER components 480 perform clock and data recovery as well as serialization operations on the respective electrical data signals and deliver pairs of the respective 20 Gbps electrical data signals to respective 1-to-2 multiplexers (MUXes) 490. Each of the MUXes 490 convert a respective 20 Gbps electrical data signal into a pair of 10 Gbps electrical data signals, which are then delivered to respective DE drivers 460. The DE drivers 460 de-emphasize and amplify the respective 10 Gbps electrical data signals and output the respective 10 Gbps electrical data signals onto internal lanes 461 for delivery to the electrical interface 410. The electrical interface 410 then outputs the eight 10 Gbps electrical data signals over lanes 403 (FIG. 2, FIG. 3) to the ASIC 160 (FIG. 2, FIG. 3).

It should be noted that many modifications may be made to the integrated circuit 400 shown in FIG. 2 while still allowing the integrated circuit 400 to perform the tasks described above of converting pairs of 10 Gbps electrical data signals into 20 Gbps electrical data signals, and vice versa. For example, the equalizers 420 and the de-emphasis drivers 460 are optional in many cases depending on the trace lengths that carry the corresponding electrical data signals and the strength or integrity of the corresponding electrical data signals. It should also be noted that other variations may be made to the integrated circuit 400, such as replacing certain components that perform certain functions with other components that perform similar or equivalent functions. Persons of skill in the art will understand the manner in which such modifications can be made to the integrated circuit 400 while still allowing it to perform the functions described above with reference to FIGS. 2-4.

Figure 5:
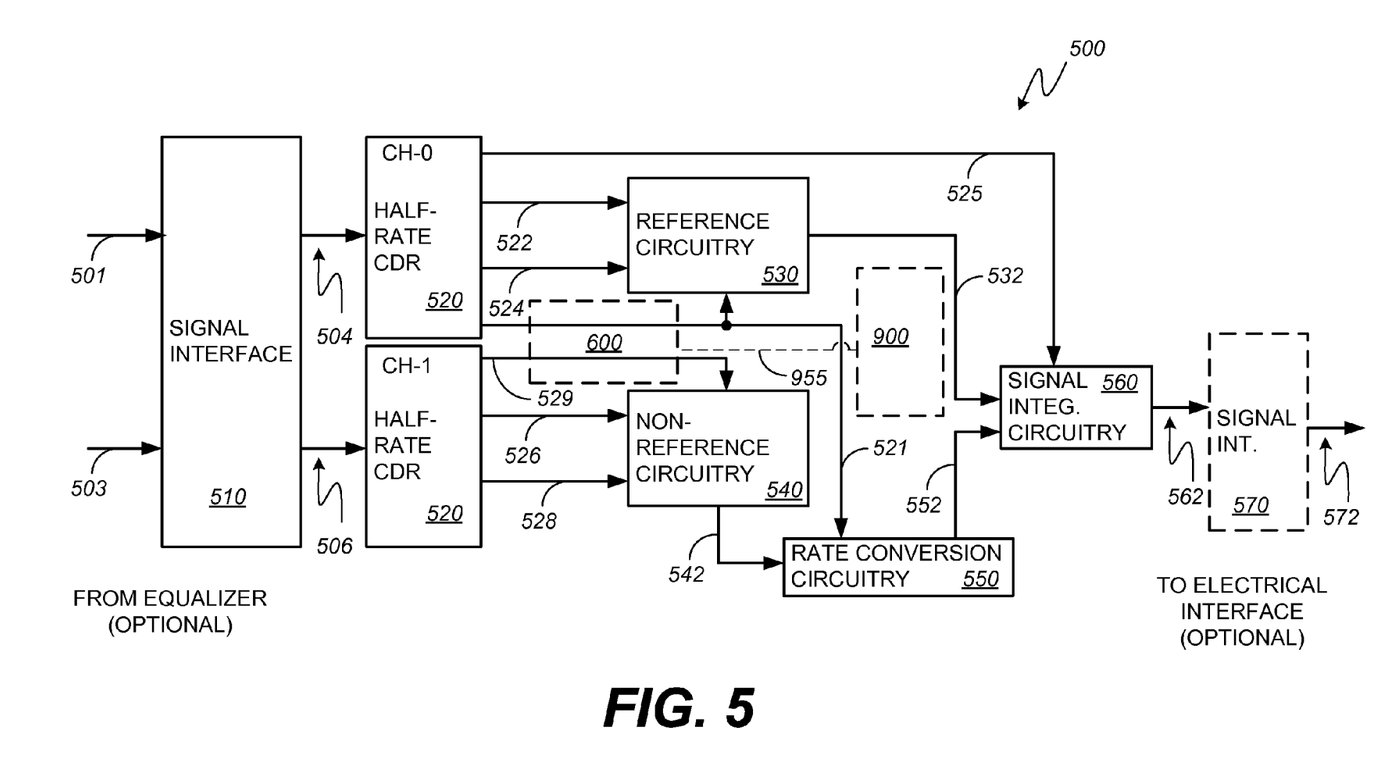
FIG. 5 illustrates a block diagram of a portion of the integrated circuit shown in FIG. 4.

FIG. 5 illustrates a block diagram of a portion 500 of the integrated circuit 400 shown in FIG. 4. In the illustrated embodiment, N serial data channels or lanes are received at a first interface, where N is a positive even integer. The integrated circuit combines the N serial data channels or lanes and provides the same at N/2 signal interfaces. For simplicity of illustration and discussion, the embodiment illustrated in FIG. 5 includes two data inputs and a single data output. As described, the serial data received in each of the N serial data channels is operative at 10 Gbps. However, those skilled in art will understand that the present circuits and methods are not limited to any particular data rate.

In the illustrated embodiment, a first signal interface 510, which may include an electrical interface such as XLAUI (i.e., a 40 Gbps attachment unit interface that includes 4 data lanes operating at 10.3125 Gbps) receives first serial data signal along connection 501 and a second serial data signal along connection 503. The first serial data signal is forwarded to a Channel-0 half-rate clock and data recovery element 520 along connection 504. The second serial data signal is forwarded to a Channel-1 half-rate clock and data recovery element 520 along connection 506. As shown the first signal interface 510 includes two input terminals for receiving two serial data signals. As is known, the serial data signals are encoded to ensure a sufficient number of signal transitions over time to recover a clock signal from the received serial data signals. The received serial data signals operate at a first data rate as set by the remote transmitter that generated the communicated serial data signal.

The half-rate clock and data recovery element 520 in each of the first channel (i.e., channel 0) and the second channel (i.e., channel 1) produces a corresponding set of recovered data signals that operate at a data rate that is half of the received data rate. As shown in FIG. 5, a first set of recovered data signals are communicated to reference circuitry 530 along connection 522 and connection 524. When the received serial data stream on connection 504 is operating at 10 Gbps, the data communicated on each of connection 522 and connection 524 will operate at 5 Gbps. In addition to the recovered data signals, the half-rate clock and data recovery element 520 in channel 0 generates and forwards a first recovered clock signal that operates at the received data rate or 10 Gbps and a second recovered clock signal that operates at half the received data rate or 5 Gbps. This second recovered clock signal is sometimes referred to as a divided clock as it is often generated by a clock divider within the half-rate clock and data recovery element 520. The first recovered clock signal is forwarded on connection 525 to the signal integration circuitry 560. The second recovered clock signal is forwarded on connection 521 to the reference circuitry 530 and the rate conversion circuitry 550. The first and second recovered clock signals operate in a first or reference clock domain.

A second set recovered data signals are generated in the half-rate clock and data recovery element 520 operating in channel 1. The second set of recovered data signals are communicated to non-reference circuitry 540 along connection 526 and connection 528. When the received serial data stream on connection 506 is operating at 10 Gbps, the data communicated on each of connection 526 and connection 528 will be operating at 5 Gbps. In addition to the second set of recovered data signals, the half-rate clock and data recovery element 520 in channel 1 generates and forwards a third recovered clock signal that operates at half the received data rate or 5 Gbps. This third recovered clock signal is sometimes referred to as a divided clock signal as it is often generated by a clock divider within the half-rate clock and data recovery element 520. The third recovered clock signal is forwarded on connection 529 to the non-reference circuitry 540. The third recovered clock signal operates in a second or non-reference clock domain.

The reference circuitry 530 receives the set of recovered serial data signals on connection 522 and connection 524 that represent the serial data signal received on connection 501. The reference circuitry 530 further receives the second recovered clock signal or reference clock signal on connection 521. As explained, the second recovered clock signal operates at 5 Gbps in the channel 0 or reference clock domain. The reference circuitry 530 is arranged to combine the set of recovered serial data signals to generate a representation of the serial data signal received at the first member of the pair of input terminals (i.e., along connection 501). The reference circuitry 530 can be implemented using a 2×1 multiplexer (not shown) with the 2 data inputs arranged to receive the set of recovered serial data signals (both operating at 5 Gbps in the reference clock domain) and the single data output providing a combined representation of the recovered serial data signals at the first data rate (i.e., 10 Gbps). The representation of the channel 0 serial data signal is forwarded on connection 532 to the signal integration circuitry 560.

The non-reference circuitry 540 receives the set of recovered serial data signals on connection 526 and connection 528 that represent the serial data signal received on connection 503. The non-reference circuitry 540 further receives the third recovered clock signal on connection 529. As explained, the third recovered clock signal operates at 5 Gbps in the channel 1 or non-reference clock domain. The non-reference circuitry 540 is arranged to combine the second set of recovered serial data signals to generate a representation of the serial data signal received at the remaining member of the pair of input terminals (i.e., along connection 503). The non-reference circuitry 540 can be implemented using a 1×M demultiplexer (not shown) with the data input arranged to receive the set of recovered serial data signals (both operating at 5 Gbps in the non-reference clock domain) and the M data outputs providing a representation of the recovered serial data signals at a significantly reduced clock rate in accordance with a demultiplexer clock signal. When M is the integer 32, the representation of the channel 1 serial data signal is forwarded across 32 conductors on parallel connection 542 to the rate conversion circuitry 540. The representation of the channel 1 serial data signal at the input of the non-reference circuitry 540 operates at the second data rate or 5 Gbps. In contrast, the representation of the channel 1 serial data signal on parallel connection 542 operates at the rate of a demultiplexer clock signal. This rate conversion occurs in the non-reference clock domain.

The rate conversion circuitry 550 receives the representation of the serial data signal at the M input terminals on connection 542 from the non-reference circuitry 540. The rate conversion circuitry 550 further receives the reference or second recovered clock signal along connection 521 from the half-rate clock and data recovery element 520 in the reference clock domain. The rate conversion circuitry 550 is arranged to generate a rate converted representation of the serial data signal received on connection 542 (i.e., the representation of the channel 1 serial data signal). This rate conversion occurs in the reference clock domain. The rate conversion circuitry 550 can be implemented using a 1×M multiplexer (not shown) with the M data inputs arranged to receive the set of recovered serial data signals (operating at 312 Mbps) and the single data output providing a representation of the recovered serial data signals at a significantly higher clock rate in accordance with the multiplexer clock signal. The rate converted representation is returned to the first data rate (e.g., 10 Gbps) in accordance with the reference or second recovered clock received on connection 521. The rate conversion circuitry 550 forwards a rate-adjusted representation of the channel 1 serial data signal to the signal integration circuitry 560 on connection 552.

Synchronization circuitry 600 adjusts a phase margin between the reference clock and the non-reference clock as applied to the non-reference circuitry 540 and the rate conversion circuitry 550. The synchronization circuitry will be explained in association with the embodiment illustrated in FIG. 6. The synchronization circuitry 600 is responsive to an alignment control signal communicated on connection 901 from alignment detection circuitry 900. The alignment detection circuitry will be explained in association with the embodiment illustrated in FIG. 9. The alignment detection circuitry 900 receives a divided clock in the reference clock domain, a divided clock in the non-reference clock domain and a sub-divided clock signal from the synchronization circuitry 600. Using these signals, the alignment detection circuitry 900 generates an alignment control signal in response to a detected offset between the reference and non-reference clock signals.

The signal integration circuitry 560 receives the recovered clock (i.e., a 10 GHz clock signal) on connection 525, the representation of the serial data signal received at the first member of the pair of input terminals as provided on connection 532 from the reference circuitry 530, and the rate converted representation of the serial data signal received at the remaining member of the pair of input terminals on connection 552. The signal integration circuitry 560 is arranged to generate a combined serial data signal in accordance with the recovered clock signal.

As further indicated in FIG. 5, the combined serial data signal is communicated on connection 562 to a signal interface 570. The signal interface 570, which may include an electrical interface such as XLAUI has one less output connection (e.g., connection 572) than the number of input connections (e.g., connection 501 and connection 503). The combined serial data signal communicated on connection 562 and connection 572 operates at a third data rate that is different from the first data rate and the second data rate. As described, when the first data rate is about 10 Gbps, the second data rate is about 5 Gpbs and the third data rate is twice the rate of the first data rate or about 20 Gbps.

Figure 6:
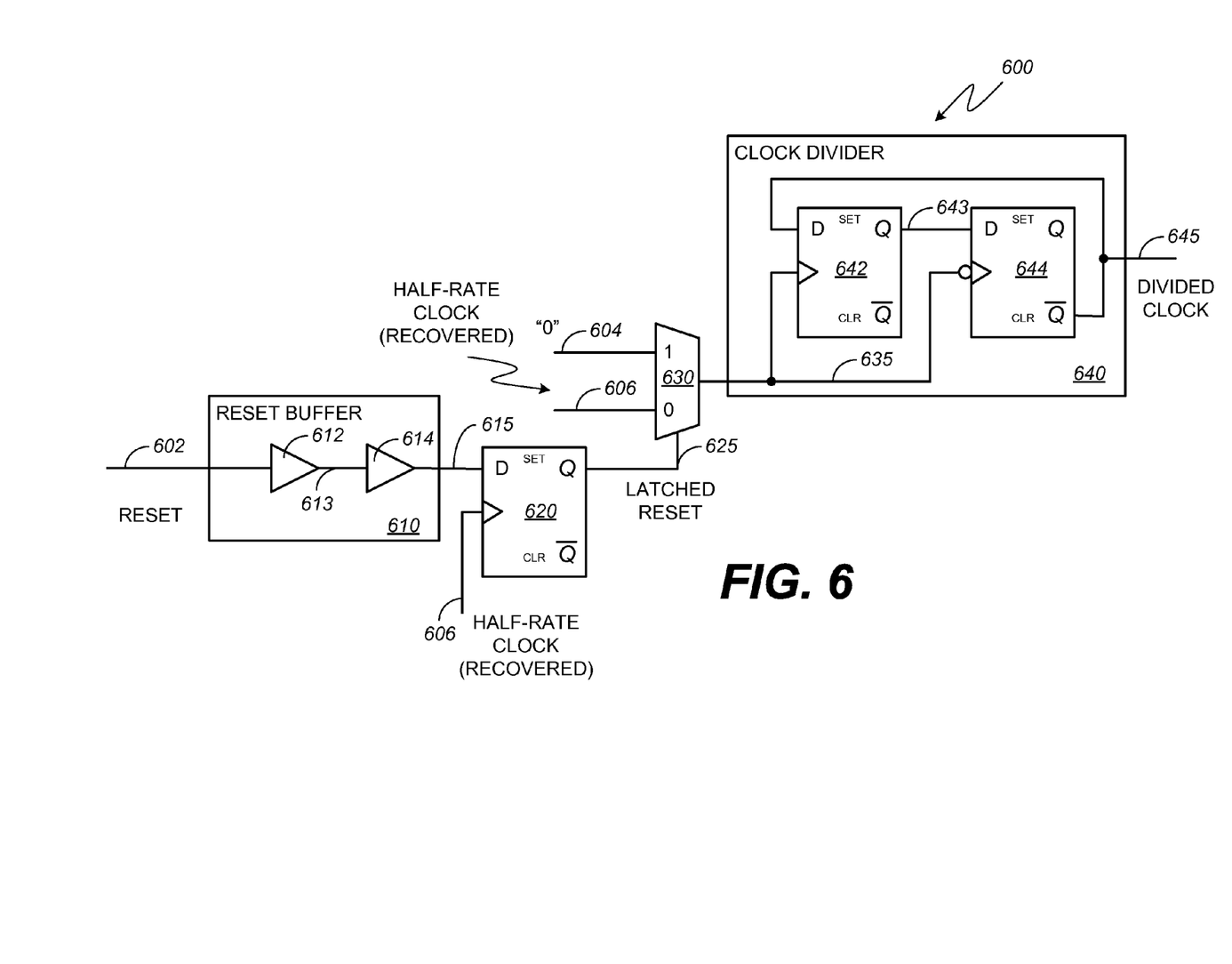
FIG. 6 illustrates a functional block diagram of the pointer initialization and synchronization circuitry shown in FIG. 5.

FIG. 6 illustrates a functional block diagram of an embodiment of the synchronization circuitry 600 introduced in FIG. 5. The synchronization circuitry 600 includes a reset buffer 610, a latch 620, a multiplexer 630 and a multiple stage clock divider 640. The reset buffer 610 includes a first buffer 612 and a second buffer 614. The reset buffer 610 receives a reset input signal on connection 602, which is coupled to the input of the first buffer 612. Connection 613 couples the output of first buffer 612 to the input of the second buffer 614. Connection 615 couples the output of the second buffer 614 and provides a buffered reset signal to the data input of latch 620. Connection 606 provides a recovered half-rate clock signal from the second or non-reference clock domain to the clock input of the latch 620 and to a first data input of the multiplexer 630. A logic low voltage on connection 604 is applied to a second data input of the multiplexer 630. The data output of the latch 620 is coupled to the select input of the multiplexer 630. A multiplexer processed clock signal is coupled via connection 635 to a clock input of a first latch 642 and a not clock input of a second latch 644 of the clock divider 640. A divided clock signal is provided on connection 645, which is coupled to the not data output of the latch 644 and the data input of the latch 642. Connection 643 couples the data output of the latch 642 to the data input of the latch 644.

In operation, the half-rate recovered clock signal on connection 606 is transmitted to the clock divider 640, which generates a divided clock signal on connection 645 that operates at half the rate of the half-rate recovered clock signal or one-quarter of the rate of the received serial data signal. Thus, when the received data signal is operating at 10 Gbps, the half-rate recovered clock signal operates at 5 Gbps and the divided clock signal operates at 2.5 Gbps. Those skilled in the art will recognize that the illustrated clock divider 640 can be extended by repeating the arrangement of the latch 642 and the latch 644 to further divide the half-rate recovered clock signal. For example, if a divided clock signal of about 312 Mbps is desired, three additional clock divider stages can be appended to the connection 645 to provide the desired clock rate. The described example arrangement is a multiple-stage clock divider consisting of L total stages or clock dividers, where L is the integer four.

Figure 7:
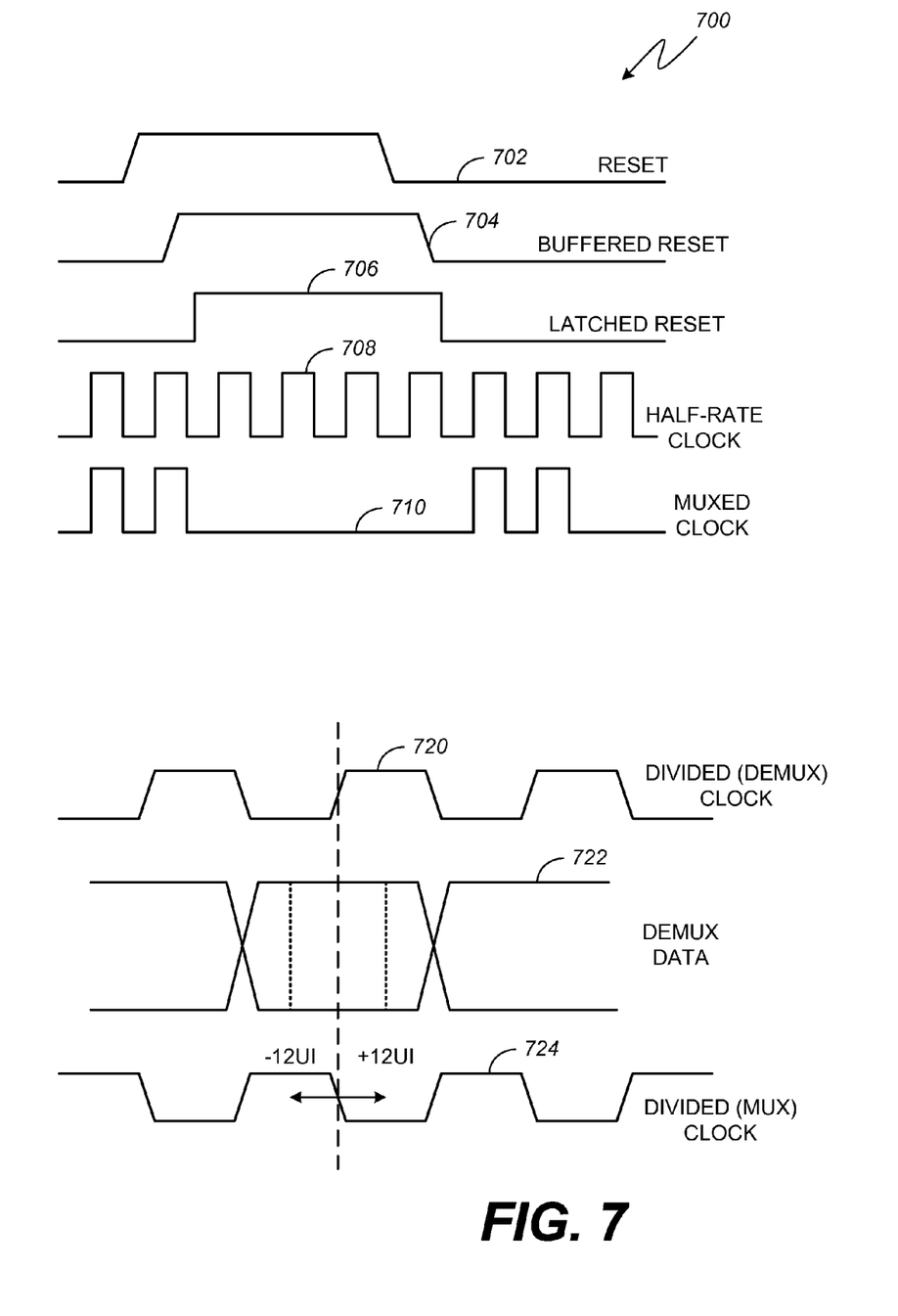
FIG. 7 illustrates a set of waveforms for various signals in the pointer initialization and synchronization circuitry shown in FIG. 6 and the multiplexed clock signals of FIG. 5.

FIG. 7 illustrates a set of waveforms for various signals in the synchronization circuitry 600 shown in FIG. 6 and the multiplexed clock signals of FIG. 5. Trace 702 represents a time-varying pulsed signal (i.e., a reset signal) as applied on connection 602 of the synchronization circuitry 600 to initialize the clock divider(s) 640. Trace 704 represents the buffered reset signal on connection 615 of the synchronization circuitry 600 and trace 706 represents the latched reset signal on connection 625, which is used to direct the multiplexer 630 to process the recovered half-rate clock received from channel 1. The half-rate recovered clock signal is represented by trace 708. The muxed clock signal (i.e., the half-rate clock signal as processed by the multiplexer 630), provided at the output of the multiplexer 630 and forwarded to the clock divider 640, is represented by trace 710.

The reset signal is generated in response to one or more conditions as determined in the half-rate clock and data recovery circuit(s) 520. For example, a reset signal may be generated in response to an indication that one or both of the half-rate clock and data recovery circuit(s) 520 have achieved frequency lock with their respective input data signals. By way of further example, the reset signal may be generated in response to an indication that one or both of the half-rate clock and data recovery circuit(s) 520 have achieved both frequency lock and phase lock with their respective input data signals.

The multiplexed clock signals of FIG. 5 as represented by the signal traces below trace 710 operate at an adjusted clock rate that is significantly different from the signals illustrated by trace 708 and trace 710. For example, in the described embodiment the half-rate clock is operating at 5 Gbps whereas both the divided (demux) clock signal illustrated by trace 720 and the divided (mux) clock signal illustrated by trace 724 are operating at about 312 Mbps. The demultiplexed data or demux data is represented by the trace 722 which indicates that the demux data can tolerate a skew between the data signals in channel 0 and channel 1 of +/−12 UI.

Figure 8:
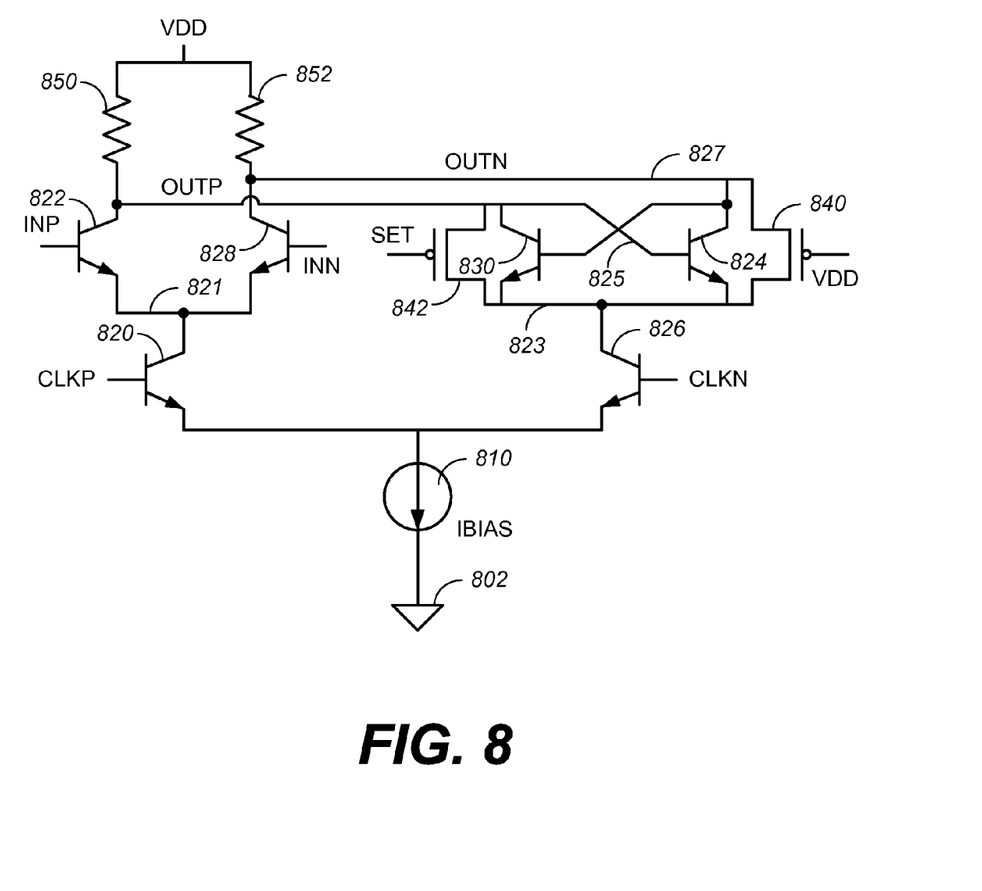
FIG. 8. illustrates an example embodiment of a clock divider latch shown in FIG. 6.

FIG. 8. illustrates an example embodiment of a clock divider latch shown in FIG. 6. The clock divider latch circuit illustrated in FIG. 8 can be used to implement both latch 642 and latch 644 in each of the multiple stages of the clock divider 640. The clock divider latch circuit includes differential clock and data signal inputs (INP and INN) as well as a set signal input (SET). As further illustrated in FIG. 8, the clock divider latch circuit provides differential data output signals (OUTP and OUTN). The clock divider latch circuit further receives a supply voltage VDD and is coupled to a reference or ground 802 with an intervening adjustable current source 810 responsive to an IBIAS input.

As indicated in FIG. 8, the clock divider latch includes a left-side or input stage responsive to the data signal inputs and positive clock (CLKP) and a right-side or output stage responsive to the set signal, the data output signals and the negative or not clock (CLKN). The input stage includes a bipolar junction transistor 820, a bipolar junction transistor 822, a bipolar junction transistor 828, a resistor 850 and a resistor 852. The output stage includes a bipolar junction transistor 826, a bipolar junction transistor 824, a bipolar junction transistor 830, a field effect transistor 840 and a field effect transistor 842. The positive clock input (CLKP) is coupled to the base of the bipolar junction transistor 820. Similarly, the negative clock input (CLKN) is coupled to the base of the bipolar junction transistor 826. The respective emitters of the bipolar junction transistor 820 and the bipolar junction transistor 826 are coupled to the adjustable current source 810. The positive data signal input (INP) is coupled to the base of bipolar junction transistor 822. Similarly, the negative data signal input (INN) is coupled to the base of bipolar junction transistor 828. The collector of bipolar junction transistor 822 is coupled via node 825 to resistor 850, the base of bipolar junction transistor 824 the collector of bipolar junction transistor 830 and the source of field effect transistor 842. The resistor 850 and the resistor 852 are further coupled to a supply voltage (VDD), which opposes node 825 and node 827. As indicated in FIG. 8, node 825 provides the positive output data signal (OUTP). The collector of bipolar junction transistor 828 is coupled via node 827 to resistor 852, the base of bipolar junction transistor 830 the collector of bipolar junction transistor 824 and the source of field effect transistor 840. As indicated in FIG. 8, node 827 provides the negative output data signal (OUTN). The collector of bipolar junction transistor 826 is coupled via node 823 to the emitter of bipolar junction transistor 830, the emitter of bipolar junction transistor 824, the drain of field effect transistor 842 and the drain of field effect transistor 840.

Figure 9:
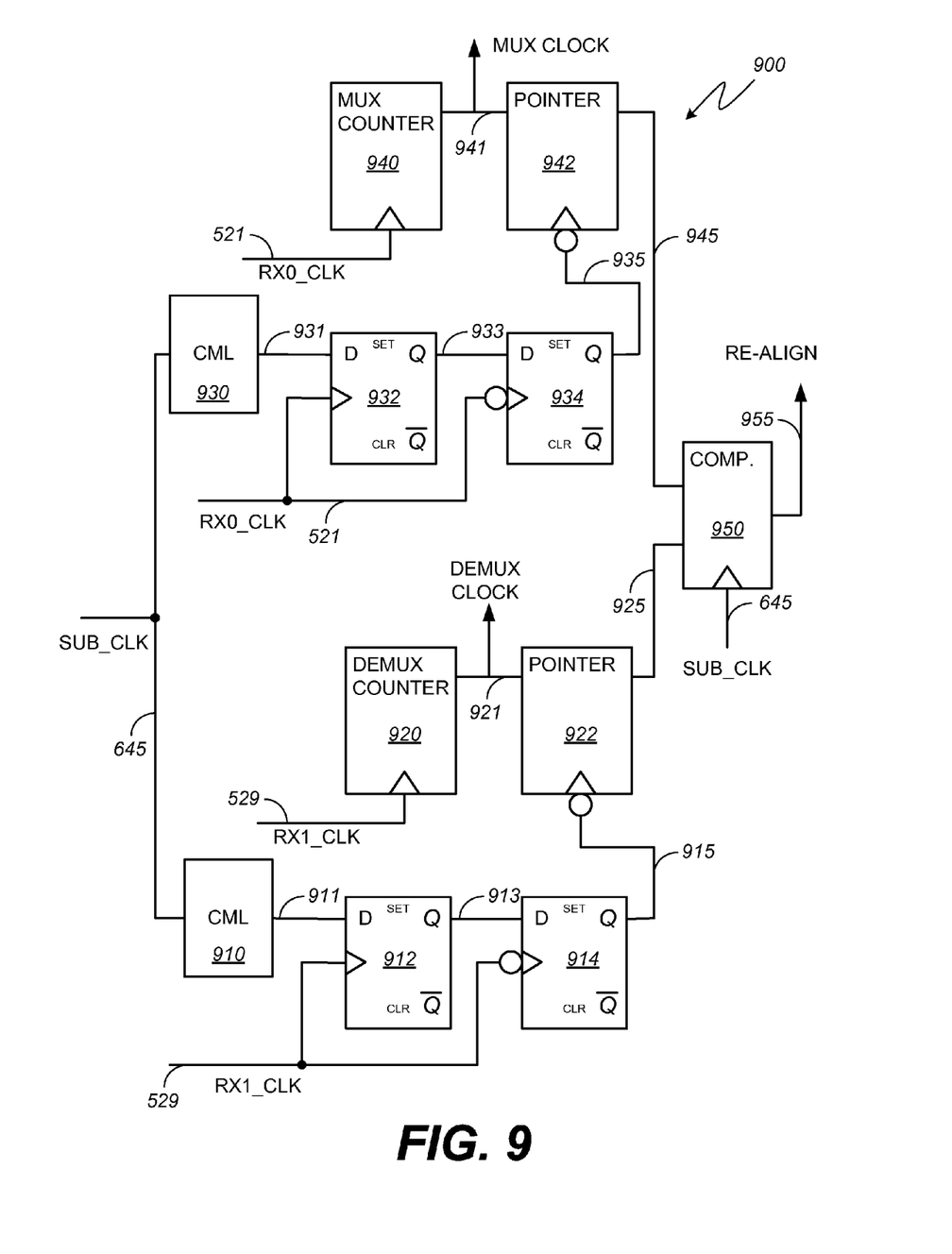
FIG. 9 illustrates a functional block diagram of the skew detection circuit shown in FIG. 5.

FIG. 9 illustrates a functional block diagram of the alignment detection circuitry 900 shown in FIG. 5. The alignment detection circuitry 900 monitors respective channel performance and detects conditions indicative that a realignment or initialization of the demux and mux clock signals is in order.

The alignment detection circuitry 900 generates an alignment control signal in response to a detected offset. The alignment detection circuitry 900 includes respective circuits arranged with a pointer and a counter. The alignment detection circuitry 900 is arranged to receive a divided clock in the reference clock domain (RX0_CLK), a divided clock in the non-reference clock domain (RX1_CLK) and the sub-divided clock signal from the synchronization circuitry 600. A comparator, operating in accordance with the sub-divided clock signal, is used to determine if the difference between a mux clock pointer value and a demux clock pointer value is within a threshold value. The threshold value may be preconfigured or stored in a register or read only memory element (not shown) coupled to the comparator. Alternatively, the threshold value may be programmable and adjusted as may be desired.

The mux and demux counters are initialized to align the mux sampling clock to the demux clock and maximize the set-up and hold margin at their interface. Proper counter initialization techniques need to be considered to guarantee a proper and glitch free pointer alignment under all operating conditions. In the particular implementation, the counters are reset and released once both receive clock and data recovery elements are in locked condition. There are two modes of operation for the mux/demux counter initialization. In a first mode of operation, the mux/demux counters are initialized in response to an indication that the half-rate clock and data recovery elements 520 are in frequency lock with the received data signals. In a second mode of operation, the mux/demux counters are initialized in response to an indication that the half-rate clock and data recovery elements 520 are both in frequency lock and phase lock with the received data signals.

A first or demux clock monitoring portion of the alignment detection circuitry 900 includes current-mode logic element 910, latch 912, latch 914, demux counter 920 and pointer 922. The first or demux clock monitoring portion of the alignment detection circuitry 900 receives a sub-divided clock on connection 645, a demux clock on connection 921 and a clock signal recovered from channel 1 (the non-reference clock domain) on connection 529. The sub-divided clock is provided at an input of current-mode logic element 910, which is arranged to transmit differential signals at speeds between 312 Mbps and 3.12 Gbps over a standard printed circuit board. In the illustrated embodiment, the current-mode logic element 910 provides the sub-divided clock signal along connection 911 to the data input of the latch 912. The data output of the latch 912 is coupled to the data input of the latch 914 by connection 913. The clock inputs of the latch 912, the latch 914 and the demux counter 920 receive the recovered half-rate clock by way of connection 529. The data output of the latch 914 is coupled to the clock input of pointer 922 by connection 925. The demux clock on connection 921 is coupled to the data inputs of the demux counter 920 and the pointer 922. Connection 925 couples the data output of the pointer 922 to an input of the comparator 950.

Similarly, the current-mode logic element 930 provides the sub-divided clock signal along connection 931 to the data input of the latch 932. The data output of the latch 932 is coupled to the data input of the latch 934 by connection 933. The clock inputs of the latch 932, the latch 934 and the mux counter 940 receive the recovered half-rate clock from the reference clock domain by way of connection 521. The data output of the latch 934 is coupled to the clock input of pointer 942 by connection 935. The mux clock on connection 941 is coupled to the data inputs of the mux counter 940 and the pointer 942. Connection 945 couples the data output of the pointer 942 to the remaining input of the comparator 950. As indicated, the comparator determines a difference between the received pointer values and compares the difference with a threshold value. As long as the difference is less than the threshold value the mux and demux clocks are considered in satisfactory alignment. When the difference is greater than or equal to the threshold value, the mux and demux clocks are no longer in alignment and the comparator 950 issues a re-alignment control signal on connection 955. The re-alignment control signal may be used to reset the synchronization circuitry 600, the respective latches, clock dividers, pointers and counters. In addition, the re-alignment control signal may be used to reset or reinitialize the respective clock and data recovery elements 520.

The SUB_CLK input on connection 645 is a low frequency sub-sampling clock signal that is used by the alignment detection circuitry 900 to detect a collision. During a system initialization, the high-speed mux and demux counters are synchronized to allow for maximum skew between the signals in the respective data channels. A collision condition occurs if the value of the two high-speed counters deviate by more than M/2-SLACK from each other. A collision condition is determined in the alignment detection circuitry 900 operating at a relatively lower frequency than the frequency of the received data signals. The alignment detection circuitry 900 uses the low-frequency SUB_CLK to sample the high-speed counters and compare the difference of their values checking |Demux-Mux|<M/2-SLACK. Nodes 931, 933 and 935 synchronize the edge of the low-frequency SUB_CLK to the edge of the high-frequency RX0_CLK of the Mux. Similarly, nodes 911, 913 and 915 synchronize the edge of the low-frequency SUB_CLK to the RX1_CLK of the Demux. The synchronized edge of the RX0_CLK on connection 935 is used by the pointer 942 to sample a value from the Mux counter 940. Similarly, the synchronized edge of the RX1_CLK on connection 915 is used by the pointer 922 to sample a value from the Demux counter 920. Pointer 942 and pointer 922 will store such values for the duration of the SUB_CLK for comparison in the comparator 950. In case of a collision, an alarm flag is set and an interrupt or re-alignment control signal is issued to the system. The alignment detection circuitry 900 has the option to realign the counters by resetting the communication link.

Figure 10:
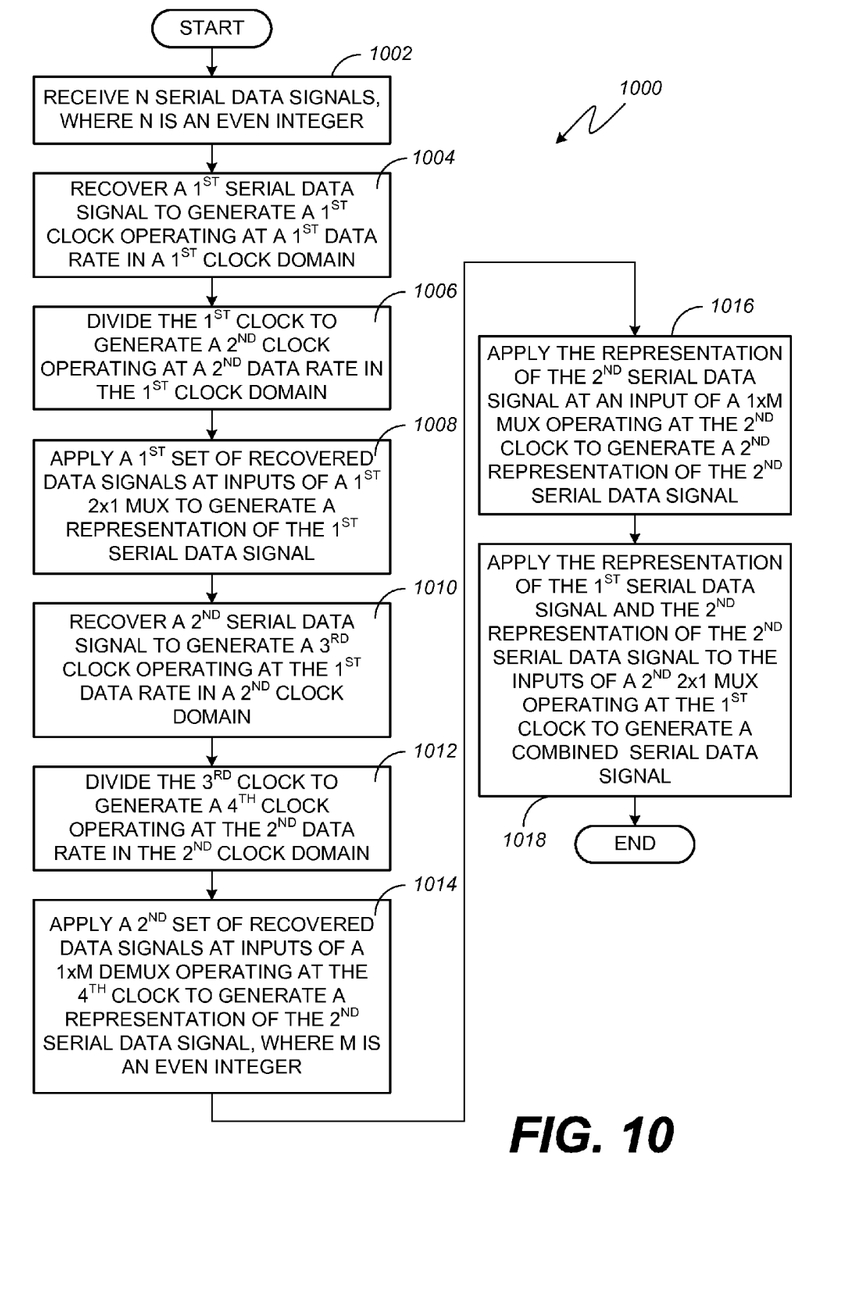
FIG. 10 illustrates a flow diagram in accordance with an embodiment of a method for aligning and integrating serial data streams.

FIG. 10 illustrates a flow diagram in accordance with an embodiment of a method 1000 for aligning and integrating serial data streams. The method 1000, which can be enabled in an integrated circuit or with a collection of non-integrated circuit elements, begins with block 1002 where N serial data signals are received in an interface having N input terminals and where N is an even integer. In block 1004, a clock and data recovery circuit is used to recover a first serial data signal to generate a first clock operating at a first data rate in a first clock domain. As explained above, the clock and data recovery circuitry is arranged to generate a clock signal from signal transitions in the recovered first serial data signal. In block 1006, the first clock is divided to generate a second clock signal operating at a second data rate in the first clock domain.

In block 1008, a first set of recovered data signals are applied at the inputs of a first 2×1 multiplexer to generate a representation of the first serial data signal. In block 1010, a clock and data recovery circuit is used to recover a second serial data signal to generate a third clock signal operating at the first data rate in a second clock domain. In block 1012, the third clock is divided to generate a fourth clock signal operating at the second data rate in the second clock domain. In block 1014, the second set of data signals are applied at the inputs of a 1×M demultiplexer operating at the fourth clock signal to generate a representation of the second serial data signal. As further indicated in block 1014, M is an even integer. As indicated above in accordance with the embodiment illustrated in FIG. 5, M is preferably the even integer "32."

In block 1016, the representation of the second serial data signal is applied at the input of a 1×M multiplexer operating in accordance with the second clock signal to generate a second representation of the second serial data signal. Thereafter, in block 1018, the representation of the first serial data signal and the second representation of the second serial data signal are applied at the inputs of a second 2×1 multiplexer operating in accordance with the first clock signal to generate a combined serial data signal. As described above, where N is the integer 2 and M is the integer 32, one of the recovered sets of serial data signals will be rate converted by the 1×32 demultiplexer. It is at this slower rate that any skew or difference between the signal transitions between the first channel and the second channel is corrected. The clock signals forwarded to the 1×32 demultiplexer and the 1×32 multiplexer are aligned during startup and/or in response to a reset input signal to maximize the phase margin at the interface between the demultiplexer and the multiplexer. Due to synchronization uncertainty, a +/−12 UI skew tolerance between the clock domains (i.e., the first channel and the second channel) is facilitated. Thereafter, the recovered and rate adjusted data signal is then multiplexed back up to the original data rate using a clock signal from the other clock domain.

The above description of FIGS. 2-10 and in particular the description of FIGS. 5-10 has demonstrated illustrative embodiments of a method and apparatus that enable the data rate of an optical fiber link to be substantially increased (e.g., doubled) without having to redesign the ASICs that are used in the backplanes of the link. In the illustrative embodiments described above, a 20 Gbps optical transceiver module is used in conjunction with an ASIC that inputs and outputs 10 Gbps electrical data signals and with a bridge IC that converts 10 Gbps electrical data signals into 20 Gbps electrical data signals, and vice versa, to upgrade an optical fiber link to have at least double its previous bandwidth. By avoiding the need to redesign the ASICs that are used in the backplane, a substantial cost savings is realized while still achieving the much higher bandwidth of the upgraded optical fiber link. It should be noted that while the embodiments of the invention have been described with respect to upgrading an optical fiber link, the method and apparatus applies equally to building a new optical fiber link that uses the optical communications systems 100 or 200 described above with reference to FIGS. 2 and 3, respectively.

It should be noted that the method and apparatus have been described with reference to a few illustrative embodiments for the purpose of demonstrating principles and concepts of operation. For example, although a particular logical configuration has been described with reference to FIG. 6 for resetting a clock divider and a particular logical configuration has been described with reference to FIG. 9 for detecting when sub-divided clock signals are aligned, those skilled in the art will understand that a variety of logical configurations may be used for these purposes and that the method and apparatus are not limited to using the particular logical configurations shown in FIG. 6 and FIG. 9. Modifications may be made to the embodiments described herein without deviating from the goals or objectives of the apparatus and method.

What is claimed is:

1. A method for combining serial data streams, the method comprising:

in an interface having N input terminals and N/2 output terminals, receiving N serial data signals having a first data rate, wherein N is an even integer;

recovering a first serial data signal received at a first of the N input terminals to generate a first clock signal operating at the first data rate in a first clock domain;

dividing the first clock signal to generate a second clock signal operating at a second data rate in the first clock domain;

applying a first set of recovered data signals at respective inputs of a first 2×1 multiplexer to generate a representation of the first serial data signal;

recovering a second serial data signal received at a second of the N input terminals to generate a third clock signal operating at the first data rate in a second clock domain;

dividing the third clock signal to generate a fourth clock signal operating at the second data rate in the second clock domain;

applying a second set of recovered data signals at respective inputs of a 1×M demultiplexer operating in accordance with the fourth clock signal to generate a first representation of the second serial data signal, where M is an even integer;

applying the first representation of the second serial data signal at an input of a 1×M multiplexer operating in accordance with the second clock signal to generate a second representation of the second serial data signal; and applying the representation of the first serial data signal and the second representation of the second serial data signal to the inputs of a second 2×1 multiplexer operating in accordance with the first clock signal to generate a combined serial data signal.

2. The method of claim 1, wherein the step of applying a first set of recovered data signals at respective inputs of a first 2×1 multiplexer to generate a representation of the first serial data signal is accomplished in accordance with the second clock signal.

3. The method of claim 1, further comprising:

aligning the second clock signal and the fourth clock signal.

4. The method of claim 3, wherein aligning the second clock signal and the fourth clock signal is performed after confirming that a first clock and data recovery circuit and a second clock and data recovery circuit are frequency locked.

5. The method of claim 3, wherein aligning the second clock signal and the fourth clock signal is performed after confirming that a first clock and data recovery circuit and a second clock and data recovery circuit are both frequency locked and phase locked.

6. An integrated circuit, comprising:

a first signal interface having N input terminals for receiving N serial data signals having a first data rate, the first signal interface including clock and data recovery circuitry that generates a set of recovered serial data streams for each of the N serial data signals, a recovered clock, and a divided clock in each of N clock domains, where N is a positive even integer;

reference circuitry coupled to receive the set of recovered serial data signals from a first member of a pair of input terminals and arranged to receive a reference clock responsive to a representation of the first data rate in a reference clock domain and to generate a representation of the serial data signal received at the first member of the pair of input terminals;

non-reference circuitry coupled to receive the set of recovered serial data signals from the remaining member of the pair of input terminals and arranged to generate a representation of the serial data signal received at the remaining member of the pair of input terminals, the representation operative at a second data rate in a non-reference clock domain;

rate conversion circuitry coupled to receive the representation of the serial data signal received at the remaining member of the pair of input terminals from the non-reference circuitry and the reference clock from the reference circuitry, the rate conversion circuitry arranged to generate a rate converted representation of the serial data signal received at the remaining member of the pair of input terminals;

synchronization circuitry for adjusting a phase margin between the reference clock and the non-reference clock as applied to the non-reference circuitry and the rate conversion circuitry; and signal integration circuitry coupled to receive the recovered clock, the representation of the serial data signal received at the first member of the pair of input terminals, and the rate converted representation of the serial data signal received at the remaining member of the pair of input terminals and arranged to generate a combined serial data signal.

7. The integrated circuit of claim 6, further comprising:
a second signal interface having N−1 output terminals for communicating the combined serial data signal.

8. The integrated circuit of claim 7, wherein the combined serial data signal operates at a third data rate different from the first data rate and the second data rate.

9. The integrated circuit of claim 8, wherein the third data rate is twice the first data rate.

10. The integrated circuit of claim 6, wherein the synchronization circuitry includes a reset buffer responsive to a reset control signal and arranged to generate a buffered version of the reset control signal, a latch coupled to receive the buffered version of the reset control signal and the recovered clock, the latch arranged to generate a latched reset signal, and a multiplexer coupled to receive a low logic signal at a first input, the recovered clock at a second input, and the latched reset signal at a select input, the multiplexer arranged to generate a multiplexed clock signal.

11. The integrated circuit of claim 10, wherein the synchronization circuitry further includes a clock divider arranged to generate a sub-divided clock signal.

12. The integrated circuit of claim 11, wherein the clock divider is a multiple stage clock divider.

13. The integrated circuit of claim 12, wherein the clock divider includes at least L stages, where L is an integer greater than 2.

14. The integrated circuit of claim 13, wherein L is four.

15. The integrated circuit of claim 11, further comprising:
alignment detection circuitry coupled to receive a divided clock in the reference clock domain, a divided clock in the non-reference clock domain and the sub-divided clock signal from the synchronization circuitry, the alignment detection circuitry arranged to generate an alignment control signal in response to a detected offset.

16. The integrated circuit of claim 15, wherein the synchronization circuitry is responsive to the alignment control signal.

17. The integrated circuit of claim 15, wherein the alignment detection circuitry includes a first pointer responsive to a first counter and arranged to generate a first value, a second pointer responsive to a second counter and arranged to generate a second value, and a comparator responsive to the subdivided clock and arranged to create the alignment control signal.

18. The integrated circuit of claim 17, wherein the comparator is responsive to a threshold value.

19. The integrated circuit of claim 18, wherein the threshold value is programmable.

20. The integrated circuit of claim 18, wherein the threshold value is predetermined.

* * * * *